United States Patent
Chen et al.

(10) Patent No.: US 10,764,931 B2
(45) Date of Patent: Sep. 1, 2020

(54) METHOD FOR TRANSMITTING RANDOM ACCESS SIGNAL AND RELATED PRODUCTS

(71) Applicant: GUANGDONG OPPO MOBILE TELECOMMUNICATIONS CORP., LTD., Dongguan, Guangdong (CN)

(72) Inventors: Wenhong Chen, Dongguan (CN); Zhi Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/355,316

(22) Filed: Mar. 15, 2019

(65) Prior Publication Data
US 2019/0215874 A1    Jul. 11, 2019

Related U.S. Application Data
(63) Continuation of application No. PCT/CN2017/088611, filed on Jun. 16, 2017.

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0026* (2013.01); *H04L 5/0051* (2013.01);
(Continued)

(58) Field of Classification Search
CPC . H04W 74/0833; H04W 74/08; H04W 24/10; H04W 72/046; H04L 5/0051; H04L 1/0026
See application file for complete search history.

(56) References Cited

U.S. PATENT DOCUMENTS
2012/0087299 A1    4/2012 Bhattad et al.
2012/0220327 A1*    8/2012 Lee ............... H04W 72/1273
                                                    455/509

FOREIGN PATENT DOCUMENTS
CN        101572949 A     11/2009
CN         10174682 A      6/2010
(Continued)

OTHER PUBLICATIONS
Corresponding extended European search report dated Aug. 19, 2019 from EP app. No. 17913309.5.
(Continued)

*Primary Examiner* — Thai Nguyen
(74) *Attorney, Agent, or Firm* — Ladas & Parry, LLP (57) ABSTRACT

Disclosed in the embodiments of the present disclosure are a method for transmitting a random access signal and related products, including: receiving, by a user equipment, serial number information of at least one channel state information reference signal (CSI-RS) sent by a network side device, where the serial number information is used for indicating a random access resource subset for measuring the at least one CSI-RS; measuring, by the user equipment, the at least one CSI-RS to select a CSI-RS, and selecting a preamble from the random access resource subset corresponding to the selected CSI-RS; and transmitting, by the user equipment, the selected preamble. The embodiments of the present disclosure are beneficial for overheads of resource indication signaling, thus improving a processing efficiency of a random access procedure.

14 Claims, 6 Drawing Sheets

(51) Int. Cl.
*H04W 72/04* (2009.01)
*H04W 24/10* (2009.01)
*H04L 5/00* (2006.01)

(52) U.S. Cl.
CPC ......... *H04W 24/10* (2013.01); *H04W 72/046* (2013.01); *H04W 74/08* (2013.01)

(56) References Cited

FOREIGN PATENT DOCUMENTS

| | | | |
|---|---|---|---|
| CN | 101742684 | A | 6/2010 |
| CN | 102548015 | A | 7/2012 |
| CN | 102685795 | A | 9/2012 |
| CN | 104854949 | A | 8/2015 |
| CN | 106797656 | A | 5/2017 |
| WO | 2018171802 | | 9/2018 |
| WO | 2018227544 | | 12/2018 |

OTHER PUBLICATIONS

Ericsson: "CSI-RS mapping to RACH configuration" vol. RVN WG1, No. Spokane, USA (Apr. 2, 2017).
ZTE: "Consideration on the 4-step random access procedure" vol. RAN WG2, No. Hangzhou, China (May 14, 2017).
Intel Corporation: "Random Access in NR" vol. RAN WG2, No. Hangzhou, China (May 14, 2017).
International Search Report for PCT/CN2017/088611 with translation from WIPO, dated Mar. 7, 2018.
Written Opinion PCT/CN2017/088611 with translation from Google translate, dated Mar. 7, 2018.
The first Office Action of corresponding Chinese application No. 201780053012, dated Nov. 28, 2019.

\* cited by examiner

METHOD FOR TRANSMITTING RANDOM ACCESS SIGNAL AND RELATED PRODUCTS

CROSS-REFERENCE TO RELATED APPLICATIONS

This application is a continuation application of the International application PCT/CN2017/088611, filed on Jun. 16, 2017, entitled "METHOD FOR TRANSMITTING RANDOM ACCESS SIGNAL AND RELATED PRODUCT", the content of which is hereby incorporated by reference in its entirety.

TECHNICAL FIELD

The present disclosure relates to the field of communications technologies, and in particular, to a method for transmitting a random access signal and related products.

BACKGROUND

The 5th-generation (5G) mobile communication technology new radio (NR) is a newly proposed topic by the 3rd Generation Partnership Project (3GPP) organization. As the new generation of 5G technology is further discussed, on the one hand, since the communication system is backward compatible, the new technology developed later tends to be compatible with the standardized technology; on the other hand, since there are a large number of existing designs in the 4th generation mobile communication (4G) technology LTE, a flexibility of 5G will be seriously affected for the sake of compatibility, thus degrading its performance Therefore, at present, 3GPP organization is focusing on parallel studies in two directions, where a technology discussion group that does not consider the backward compatibility is called 5G NR.

In a multi-beam (analog beamformed) system currently discussed by 5G/NR, different beams correspond to different directions and different coverage areas.

Correspondingly, a user equipment selects its preferred downlink transmission beam (DL Tx Beam) by measuring channel state information reference signals (CSI-RS) carried on different beams, and when performing random access, the user equipment needs to inform a network of its selected DL Tx Beam. For the random access, a current conclusion from 3GPP RAN1 is as follows: system information indicates different physical random access channel (PRACH) resources and/or preamble indices for different DL Tx Beams, that is, PRACH resources and/or preamble indies are divided into groups, and different PRACH resources and/or preamble index subsets correspond to different DL Tx Beams. There are already conclusions supporting that connected user equipments select the preferred DL Tx Beam by measuring the measurement result of the configured CSI-RS.

At present, a resource indicator of CSI-RS is used for the configuration, indication and identification of the CSI-RS in the NR system. In the NR system, the number of CSI-RSs supported by the next generation base station (gNB) is very large. If PRACH resources and the preamble index subsets of the downlink transmission beam are used for direct association of the CSI-RS resource indicator, the base station needs to send indication information with a large amount of data to the user equipment to indicate on which resources the user equipment measures the CSI-RS, and signaling overhead of such indication is relatively high, resulting in a waste of more system resources.

SUMMARY

Embodiments of the present disclosure provide a method for transmitting a random access signal and related products, so as to reduce overhead of indication signaling in a random access process and improve a processing efficiency of the random access process.

In a first aspect, a method for transmitting a random access signal according to an embodiment of the present disclosure, including:

determining, by a user equipment, at least one item of serial number information indicated by a network side device, where the at least one item of serial number information is associated with a resource indicator of at least one channel state information reference signal (CSI-RS) and with at least one random access resource subset;

measuring, by the user equipment, the at least one CSI-RS to select a CSI-RS, and selecting a preamble from a random access resource subset corresponding to the selected CSI-RS;

transmitting, by the user equipment, the selected preamble.

In a second aspect, a method for transmitting a random access signal according to an embodiment of the present disclosure, including:

indicating, by a network side device, at least one item of serial number information to a user equipment, where the at least one item of serial number information is associated with a resource indicator of at least one channel state information reference signal (CSI-RS) and with at least one random access resource subset;

receiving, by the network side device, a preamble sent by the user equipment, the preamble is selected by the user equipment from a random access resource subset corresponding to a selected CSI-RS, and the selected CSI-RS is selected by measuring the at least one CSI-RS.

In a third aspect, a user equipment according to an embodiment of the present disclosure, including a receiving unit, a selecting unit and a transmitting unit.

The receiving unit is configured to determine at least one item of serial number information indicated by a network side device, where the at least one item of serial number information is associated with a resource indicator of at least one channel state information reference signal (CSI-RS) and with at least one random access resource subset;

the selecting unit is configured to measure the at least one CSI-RS to select a CSI-RS, and select a preamble from a random access resource subset corresponding to the selected CSI-RS;

the transmitting unit is configured to transmit the selected preamble.

In a fourth aspect, a network side device according to an embodiment of the present disclosure, including a sending unit and a receiving unit, the sending unit is configured to send to a user equipment at least one item of serial number information, where the at least one item of serial number information is associated with a resource indicator of at least one channel state information reference signal (CSI-RS) and with at least one random access resource subset;

the receiving unit is configured to receive a preamble sent by the user equipment, where the preamble is selected by the user equipment from a random access resource subset corresponding to a selected CSI-RS, and the selected CSI-RS is selected by measuring the at least one CSI-RS.

In a fifth aspect, a user equipment according to an embodiment of the present disclosure, including a processor, a memory, a radio frequency chip and a program, where the program is stored in the memory and configured to be executed by the processor, and the program includes an instruction used to perform steps in any of the methods according to the first aspect of the embodiments of the present disclosure.

In a sixth aspect, a network side device according to an embodiment of the present disclosure, including a processor, a memory, a communication interface and a program, where the program is stored in the memory and configured to be executed by the processor, and the program includes an instruction for performing steps in any of the methods according to the second aspect of the embodiments of the present disclosure.

In a seventh aspect, a computer storage medium for storing computer program according to an embodiment of the present disclosure, where the computer program causes the computer to perform steps in any of the methods according to the first aspect or the second aspect of the embodiments of the present disclosure, and the computer includes a network side device and a user equipment.

In an eighth aspect, a computer program product according to an embodiment of the present disclosure, including: a computer program, the above computer program is operative to cause a computer to perform steps in any of the methods according to the first aspect or the second aspect of the embodiments of the present disclosure, and the computer includes a network side device and a user equipment.

It can be seen that, in the embodiments of the present disclosure, in the 5G/NR system, the resource indicator of the CSI-RS required by the user equipment is associated with the random access resource subset used for random access through the serial number information, and the network side device only needs to indicate the serial number information to the user equipment to notify the user equipment on which resources (i.e., resources corresponding to a resource number of the CSI-RS) the user equipment measures the CSI-RS, that is, there is no need to transmit, between the network side device and the user equipment, resource indication information used to describe measurement resources and the random access resource subset in the existing solution. Moreover, since the data amount of the serial number information is much smaller than the data amount of the resource indication information, it is beneficial to reduce the overhead of the indication signaling in the random access process and improve the processing efficiency of the random access process.

BRIEF DESCRIPTION OF THE DRAWINGS

The accompany drawings required in description of embodiments or the prior art will be briefly described below.

DESCRIPTION OF EMBODIMENTS

Figure 1:
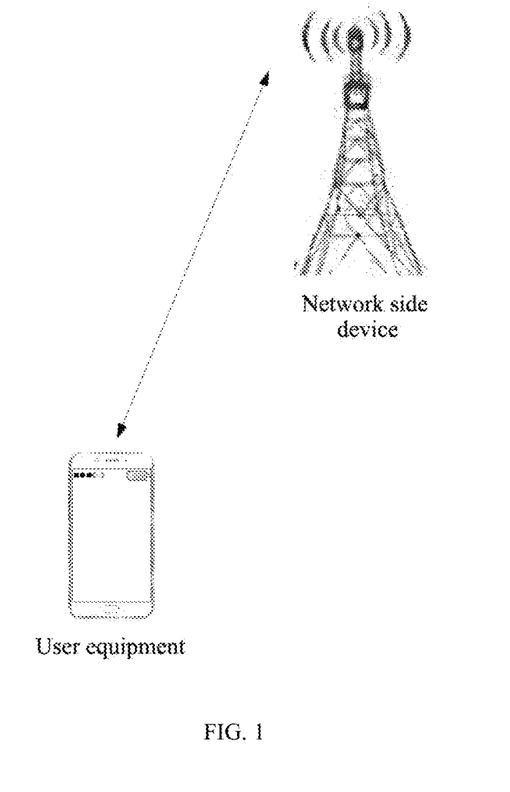
FIG. 1 is a possible network architecture of an exemplary communication system according to an embodiment of the present disclosure.

Referring to FIG. 1, FIG. 1 is a possible network architecture of an exemplary communication system according to an embodiment of the present disclosure. The exemplary communication system, for example, can be a 5G/NR system and other such communication systems. The exemplary communication system specifically includes a network side device and a user equipment, and the network side device may be a gNB base station, etc. When the user equipment accesses the mobile communication network provided by the network side device, a communication connection between the user equipment and the network side device may be implemented through a wireless link, and a communication connecting mode may be a single connecting mode or a dual connecting mode or a multiple connecting mode.

In the embodiments of the present disclosure, terms "network" and "system" are often used interchangeably, and can be understood by those skilled in the art. The terminal involved in the embodiments of the present disclosure may include various devices with a wireless communication function, such as handheld devices, vehicle-mounted devices, wearable devices, computing devices, or other processing devices connected to the wireless modem, and various forms of user equipments (UE), mobile stations (MS), terminal devices, and the like. For convenience of description, the above devices are collectively referred to as UE.

In the following, technical solutions in the embodiments of the present disclosure will be described in detail with reference to the accompany drawings.

Figure 2:
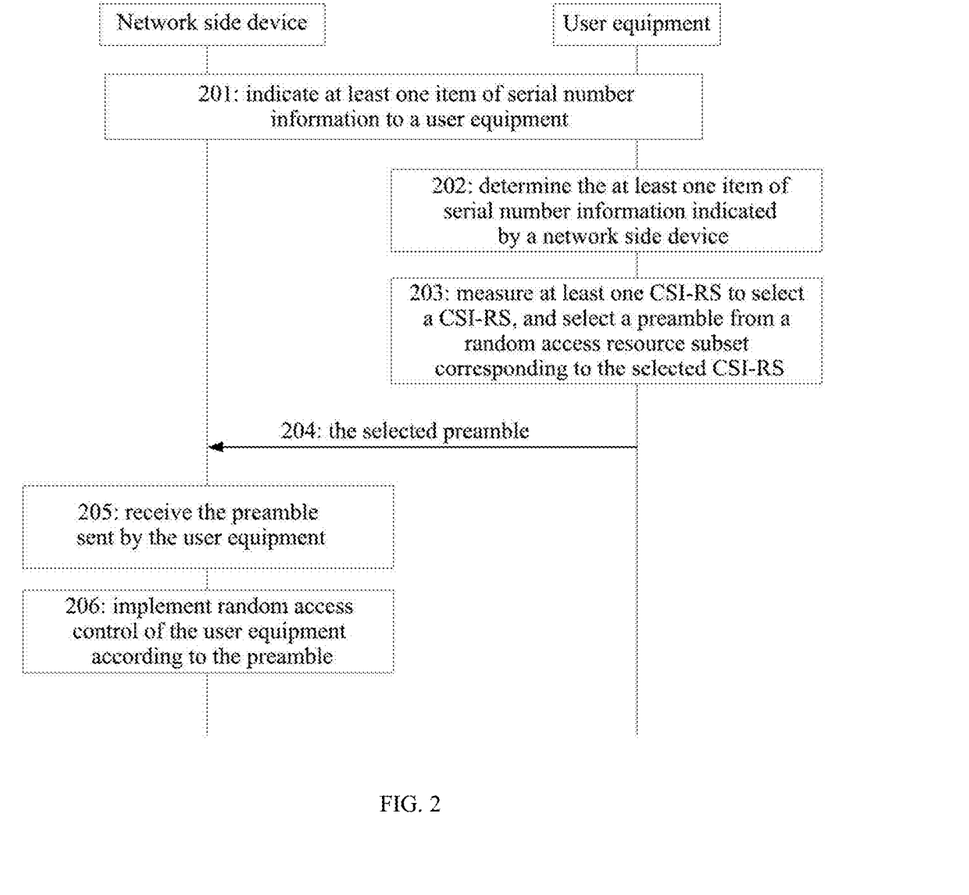
FIG. 2 is a communication schematic diagram of a method for transmitting a random access signal according to an embodiment of the present disclosure.

Referring to FIG. 2, FIG. 2 is a flowchart schematic diagram of a method for transmitting a random access signal according to an embodiment of the present disclosure, which is applied to a 5G/NR system including a user equipment and a network side device, and the method includes:

In section 201, the network side device indicates at least one item of serial number information to a user equipment, where the at least one item of serial number information is associated with a resource indicator of at least one channel state information reference signal (CSI-RS) and with the at least one random access resource subset.

Where the CSI-RS is used for measuring information such as a channel quality indicator (CQI), a precoding matrix indicator (PMI), a rank indication (RI) and the like. The CQI is used to reflect a channel quality of a physical downlink shared channel (PDSCH). The channel quality of the PDSCH is represented by 0-15. 0 indicates the worst channel quality, and 15 indicates the best channel quality. The UE transmits a CQI to a base station on a physical uplink control channel (PUCCH) or a physical uplink shared channel (PUSCH). The base station may determine a condition of the current PDSCH after obtaining this CQI value, so as to schedule the PDSCH accordingly. The RI is used to indicate the valid number of data layers of the PDSCH, which is to tell the base station the number of code word (CW) that the UE can support currently. That is, RI=1, 1CW, RI>1, 2 CW. CW-Code Word. The PMI is used to indicate an index of a code book set. Since the multi-antenna MIMO technology is applied to the 5G/NR system, there is a precoding technique in the baseband processing of the PDSCH physical layer.

In a possible example, the serial number information is a dedicated number of each CSI-RS in least one CSI-RS signal pre-configured by the network side device for the user equipment or in at least one CSI-RS signal measurement activated by the network side device for the user equipment.

In a possible example, the specific implementation manner in which the network side device indicates the at least one item of serial number information to the user equipment is that: the network side device transmits at least one dedicated number to the user equipment.

In a possible example, the serial number information is a sequence number of each CSI-RS in at least one CSI-RS signal pre-configured by a network side device for the user equipment or in at least one CSI-RS signal measurement activated by the network side device for the user equipment, and the sequence number includes any one of the following: a time domain sequence number, a resource location sequence number, CSI-RS resource identification information, configuration signaling, or a field sequence number in activation signaling.

In this possible example, the specific implementation manner in which the network side device indicates the at least one item of serial number information to the user equipment is that: the network side device transmits resource indication information to the user equipment, where the resource indication information includes the resource indicator of at least one CSI-RS, and the resource indicator of the at least one CSI-RS is used to indicate a sequence number of the corresponding CSI-RS.

Where the random access resource set includes a set of resources for random access random access, and further includes a set of resources for other operations, which is not limited herein.

In section 202, the user equipment determines at least one item of serial number information indicated by a network side device, where the at least one item of serial number information is associated with a resource indicator of at least one channel state information reference signal (CSI-RS) and with at least one random access resource subset.

In section 203, the user equipment measures the at least one CSI-RS to select a CSI-RS, and selects a preamble from a random access resource subset corresponding to the selected CSI-RS.

In section 204, the user equipment transmits the selected preamble.

In section 205, the network side device receives the preamble sent by the user equipment, where the preamble is selected by the user equipment from a random access resource subset corresponding to a selected CSI-RS, and the selected CSI-RS is selected by measuring the at least one CSI-RS.

In section 206, the network side device implements random access control of the user equipment according to the preamble.

It can be seen that, in the embodiments of the present disclosure, in the 5G/NR system, the resource indicator of the CSI-RS required by the user equipment is associated with the random access resource subset used for random access by using the serial number information, and the network side device only needs to indicate the serial number information to the user equipment to notify the user equipment on which resources (i.e., resources corresponding to a resource number of the CSI-RS) the user equipment measures the CSI-RS, that is, there is no need to transmit, between the network side device and the user equipment, resource indication information used to describe measurement resources and the random access resource subset in the existing solution. Moreover, since the data amount of the serial number information is much smaller than the data amount of the resource indication information, it is beneficial to reduce the overhead of the indication signaling in the random access process and improve the processing efficiency of the random access process.

In a possible example, the method further includes: determining, by the user equipment, serial number information corresponding to the selected CSI-RS according to a first mapping relationship set between serial number information and a resource indicator of a CSI-RS; and determining, by the user equipment, the random access resource subset corresponding to the selected CSI-RS according to a preset second mapping relationship between serial number information and a random access resource subset.

Where the first mapping relationship set at least includes at least a mapping relationship received by the user equipment between the at least one item of serial number information and the resource indicator of the at least one corresponding CSI-RS, and the second mapping relationship set at least includes at least a mapping relationship received by the user equipment between the at least one item of serial number information and the at least one corresponding random access resource subset.

In this possible example, the amount of the serial number information in the first mapping relationship set is less than the amount of all the serial number information supported by the network side device.

It can be seen that, in this example, since the user equipment does not need to pre-store all the serial number information, and the serial number information is associated with the random access resource subset, thus reservation overhead for the random access resource subset can be reduced.

In a possible example, the random access resource subset is a combination of a random access channel PRACH resource and/or a resource for preamble indices, and the PRACH resource includes a PRACH time domain resource and/or a PRACH frequency domain resource.

In a possible example, the random access resource subset includes a preamble index.

In a possible example, the PRACH is a PRACH signal used for random access, or is a PRACH signal or a PRACH-like signal used for transmitting a beam recovery request to the network side device in a beam failure recovery process.

Where the above PRACH-like signal refers to a signal that is optimized or improved based on an existing RACH signal.

In a possible example, the at least one CSI-RS is correspondingly carried on at least one beam, where the beam for carrying the selected CSI-RS is a downlink transmission beam that is determined by the user equipment and used for transmission of at least part of steps the random access process.

Where the downlink transmission beam corresponds to a channel or a signal, which is not limited herein.

Where the user equipment needs to transmit to the network side device the RACH signal or the RACH-like signal after selecting the DL Tx beam in at least the following two cases: (1) in cell handover, the user equipment needs to transmit an NR PRACH signal (a PRACH signal in the NR system is called as an NR PRACH signal for short) to a new cell; (2) After a beam failure, the user equipment needs to notify the network side device of the available beam (or the recommended beam) it has found through the NR PRACH signal (or a channel based on PRACH, which may be modified based on the existing PRACH design, and mainly used for transmitting a beam failure recovery request signal to a network side device) after it has found a new available beam according to the measurement result of the measured CSI-RS signal.

In a possible example, the method further includes: the network side device carries the preset indication information when configuring a CSI-RS, in order to indicate the first mapping relationship set and the second mapping relationship set; or the network side device carries the preset indication information when activating a CSI-RS measurement, in order to indicate the first mapping relationship set and the second mapping relationship set; or the network side device transmits the preset indication information, in order to indicate the first mapping relationship set and the second mapping relationship set; or the network side device presets and stores the first mapping relationship set and the second mapping relationship set.

The embodiments of the present disclosure are specifically described below with reference to specific application scenarios.

Figure 3A:
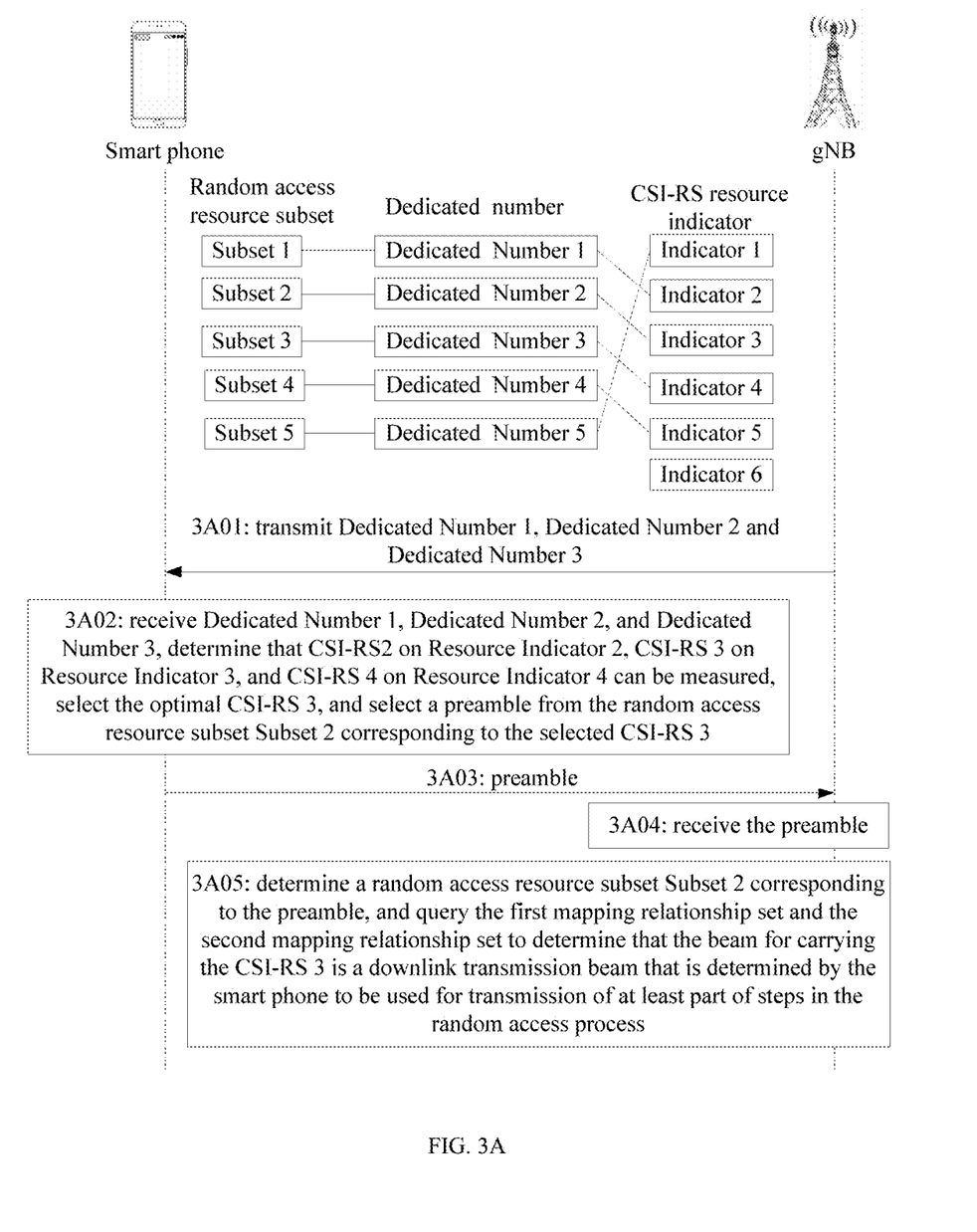
FIG. 3A is a schematic diagram of a 5G NR system implementing data mapping transmission according to an embodiment of the present disclosure.

As shown in FIG. 3A, it is assumed that the user equipment is a smart phone, the network side device is a gNB in the 5G/NR system, the random access resource subset includes Subset 1, Subset 2, Subset 3, Subset 4 and Subset 5, the dedicated number includes Dedicated Number 1, Dedicated Number 2, Dedicated Number 3, Dedicated Number 4 and Dedicated Number 5, the resource number of the RCS-RS includes Indicator 1, Indicator 2, Indicator 3, Indicator 4, Indicator 5 and Indicator 6, and in the first mapping relationship set, Dedicated Number 1 corresponds to Indicator 2, Dedicated Number 2 corresponds to Indicator 3, Dedicated Number 3 corresponds to Indicator 4, Dedicated Number 4 corresponds to Indicator 5, and Dedicated Number 5 corresponds to Indicator 1, in the second mapping relationship set, Dedicated Number 1 corresponds to Subset 1, Dedicated Number 2 corresponds to Subset 2, Dedicated Number 3 corresponds to Subset 3, Dedicated Number 4 corresponds to Subset 4, and Dedicated Number 5 corresponds to Subset 5, then the method for transmitting a random access signal according to the embodiments of the present disclosure includes following steps:

In section 3A01, the gNB transmits Dedicated Number 1, Dedicated Number 2 and Dedicated Number 3 to the user equipment.

In section 3A02, the smart phone receives Dedicated Number 1, Dedicated Number 2 and Dedicated Number 3, determines that CSI-RS 2 on Resource Indicator 2, CSI-RS 3 on Resource Indicator 3 and CSI-RS 4 on Resource Indicator 4 can be measured, and selects the optimal CSI-RS 3, and selects a preamble from the random access resource subset Subset 2 corresponding to the selected CSI-RS 3.

In section 3A03, the smart phone transmits the preamble to the gNB.

In section 3A04, the gNB receives the preamble.

In section 3A05, the gNB determines the random access resource subset Subset 2 corresponding to the preamble, and queries the first mapping relationship set and the second mapping relationship set so as to determine that the beam for carrying the CSI-RS 3 is a downlink transmission beam that is determined by the smart phone to be used for transmission of at least part of steps in the random access process.

The embodiments of the present disclosure will be specifically described below with reference to specific application scenarios.

Figure 3B:
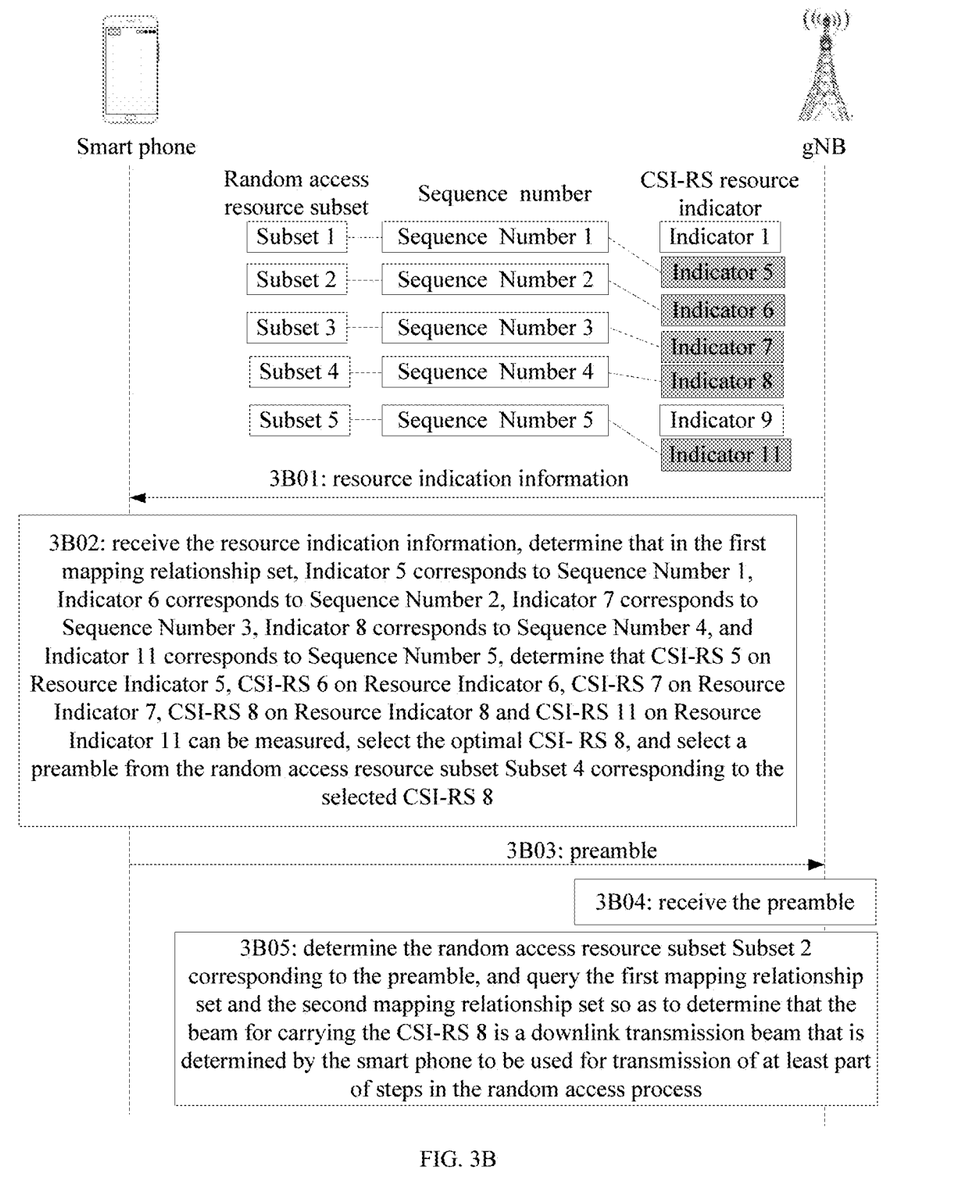
FIG. 3B is a schematic diagram of another 5G NR system implementing data mapping transmission according to an embodiment of the present disclosure.

As shown in FIG. 3B, it is assumed that the user equipment is a smart phone, the network side device is a gNB in the 5G/NR system, the random access resource subset includes Subset 1, Subset 2, Subset 3, Subset 4 and Subset 5, the sequence numbers are in the time domain, which include Sequence Number 1, Sequence Number 2, Sequence Number 3, Sequence Number 4 and Sequence Number 5, and in the second mapping relationship set, Sequence Number 1 corresponds to Subset 1, Sequence Number 2 corresponds to Subset 2, Sequence Number 3 corresponds to Subset 3, Sequence Number 4 corresponds to Subset 4, and Sequence Number 5 corresponds to Subset 5, then the method for transmitting a random access signal according to the embodiments of the present disclosure includes following steps:

In section 3B01, the gNB transmits resource indication information to the user equipment, where the resource indication information includes the resource numbers of the RCS-RS, including Indicator 5, Indicator 6, Indicator 7, Indicator 8 and Indicator 11.

In section 3B02, the smart phone receives the resource indication information; determines that in the first mapping relationship set, Indicator 5 corresponds to Sequence Number 1, Indicator 6 corresponds to Sequence Number 2, Indicator 7 corresponds to Sequence Number 3, Indicator 8 corresponds to Sequence Number 4, and Indicator 11 corresponds to Sequence Number 5; determines that CSI-RS 5 on Resource Indicator 5, CSI-RS 6 on Resource Indicator 6, CSI-RS 7 on Resource Indicator 7, CSI-RS 8 on Resource Indicator 8 and CSI-RS 11 on Resource Indicator 11 can be measured and selects the optimal CSI-RS 8; and selects a preamble from the random access resource subset Subset 4 corresponding to the selected CSI-RS 8.

In section 3B03, the smart phone transmits the preamble to the gNB.

In section 3B04, the gNB receives the preamble.

In section 3B05, the gNB determines the random access resource subset Subset 2 corresponding to the preamble, and queries the first mapping relationship set and the second mapping relationship set so as to determine that the beam for carrying the CSI-RS 8 is a downlink transmission beam that is determined by the smart phone to be used for transmission of at least part of steps in the random access process.

Figure 4:
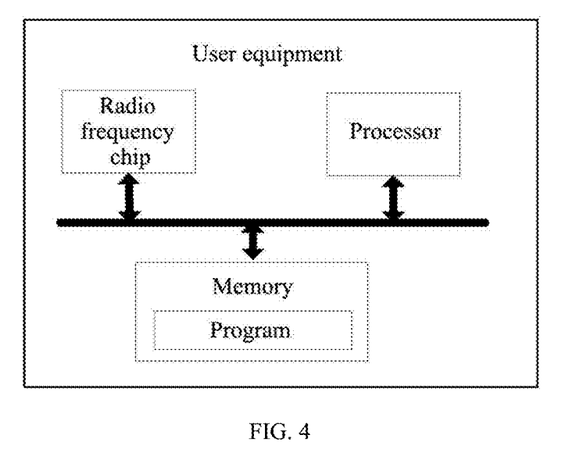
FIG. 4 is a structural diagram of a user equipment according to an embodiment of the present disclosure.

In accordance with the embodiment shown in FIG. 2 above, referring to FIG. 4, FIG. 4 is a structural diagram of a user equipment according to an embodiment of the present disclosure. As shown in the figure, the user equipment includes a processor, a memory, a radio frequency chip and a program, where the above program is stored in the above memory, and is configured to be executed by the processor, and the program includes an instruction used to perform following steps;

determining at least one item of serial number information indicated by a network side device, where the at least one item of serial number information is associated with a resource indicator of at least one channel state information reference signal (CSI-RS) and with at least one random access resource subset;

measuring the at least one CSI-RS to select a CSI-RS, and selecting a preamble from a random access resource subset corresponding to the selected CSI-RS;

transmitting the selected preamble.

It can be seen that, in the embodiments of the present disclosure, in the 5G/NR system, the resource indicator of the CSI-RS required by the user equipment is associated with the random access resource subset used for random access by using the serial number information, and the network side device only needs to indicate the serial number information to the user equipment to notify the user equipment on which resources (i.e., resources corresponding to a resource number of the CSI-RS) the user equipment measures the CSI-RS, that is, there is no need to transmit, between the network side device and the user equipment, resource indication information used to describe measurement resources and the random access resource subset in the existing solution. Moreover, since the data amount of the serial number information is much smaller than the data amount of the resource indication information, it is beneficial to reduce the overhead of the indication signaling in the random access process and improve the processing efficiency of the random access process.

In a possible example, the program further includes an instruction for performing following operations: determining serial number information corresponding to the selected CSI-RS according to a first mapping relationship set between serial number information and a resource indicator of a CSI-RS; and determining the random access resource subset corresponding to the selected CSI-RS according to a preset second mapping relationship set between serial number information and a random access resource subset.

In a possible example, the serial number information is a dedicated number of each CSI-RS in at least one CSI-RS signal pre-configured by a network side device for the user equipment or in at least one CSI-RS signal measurement activated by the network side device for the user equipment.

In a possible example, the serial number information is a sequence number of each CSI-RS in at least one CSI-RS signal pre-configured by a network side device for the user equipment or in at least one CSI-RS signal measurement activated by the network side device for the user equipment, the sequence number includes any one of the following: a time domain sequence number, a resource location sequence number, CSI-RS resource identification information, configuration signaling, or a field sequence number in activation signaling.

In a possible example, the random access resource subset is a combination of a random access channel (PRACH) resource and/or a resource for preamble indices, and the PRACH resource includes a PRACH time domain resource and/or a PRACH frequency domain resource.

In a possible example, the random access resource subset includes a preamble index.

In a possible example, the PRACH is a PRACH signal used for random access, or is a PRACH signal or a PRACH-like signal used for transmitting a beam recovery request to a network side device in a beam failure recovery process.

In a possible example, the at least one CSI-RS is correspondingly carried on at least one beam, where a beam for carrying the selected CSI-RS is a downlink transmission beam that is determined by the user equipment for transmission of at least part of steps in a random access process.

Figure 5:
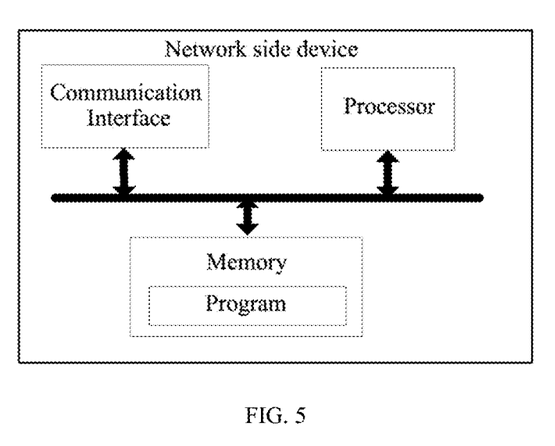
FIG. 5 is a structural diagram of a network side device according to an embodiment of the present disclosure.

In accordance with the embodiment shown in FIG. 2 above, referring to FIG. 5, FIG. 5 is a structural diagram of a network side device according to an embodiment of the present disclosure. As shown in the figure, the network side device includes a processor, a memory, a communication interface and a program, where the program is stored in the memory and configured to be executed by the processor, and the program includes an instruction for performing following steps;

transmitting, to the user equipment, at least one item of serial number information, where the at least one item of serial number information is associated with a resource indicator of at least one channel state information reference signal (CSI-RS) and with at least one random access resource subset;

receiving a preamble sent by the user equipment, where the preamble is selected by the user equipment from a random access resource subset corresponding to a selected CSI-RS, and the selected CSI-RS is selected by measuring the at least one CSI-RS.

It can be seen that, in the embodiments of the present disclosure, in the 5G/NR system, the resource indicator of the CSI-RS required by the user equipment is associated with the random access resource subset used for random access by using the serial number information, and the network side device only needs to indicate the serial number information to the user equipment to notify the user equipment on which resources (i.e., resources corresponding to a resource number of the CSI-RS) the user equipment measures the CSI-RS, that is, there is no need to transmit, between the network side device and the user equipment, resource indication information used to describe measurement resources and the random access resource subset in the existing solution. Moreover, since the data amount of the serial number information is much smaller than the data amount of the resource indication information, it is beneficial to reduce the overhead of the indication signaling in the random access process and improve the processing efficiency of the random access process.

In a possible example, the random access resource subset corresponding to the selected CSI-RS is determined by the user equipment according to a preset second mapping relationship between the serial number information and the random access resource subset, where serial number information corresponding to the selected CSI-RS is determined by the user equipment according to a first mapping relationship set between serial number information and a resource indicator of a CSI-RS.

In a possible example, the serial number information is a dedicated number of each CSI-RS in at least one CSI-RS signal pre-configured by a network side device for the user equipment or in at least one CSI-RS signal measurement activated by the network side device for the user equipment.

In a possible example, the serial number information is a sequence number of each CSI-RS in at least one CSI-RS signal pre-configured by a network side device for the user equipment or in at least one CSI-RS signal measurement activated by the network side device for the user equipment, and the sequence number includes any one of the following: a time domain sequence number, a resource location sequence number, CSI-RS resource identification information, configuration signaling, or a field sequence number in activation signaling.

In a possible example, the random access resource subset is a combination of a random access channel PRACH resource and/or a preamble resource, where the PRACH resource includes a PRACH time domain resource and/or a PRACH frequency domain resource.

In a possible example, the random access resource subset includes a preamble index.

In a possible example, the PRACH is a PRACH signal used for random access, or is a PRACH signal or a PRACH-like signal used for transmitting a beam recovery request to a network side device in a beam failure recovery process.

In a possible example, the program further includes an instruction for performing following operations: carrying the preset indication information when configuring a CSI-RS, in order to indicate the first mapping relationship set and the second mapping relationship set; or carrying the preset indication information when activating a CSI-RS measurement, in order to indicate the first mapping relationship set and the second mapping relationship set; or transmitting the preset indication information, in order to indicate the first mapping relationship set and the second mapping relationship set; or presetting and storing the first mapping relationship set and the second mapping relationship set.

The above mainly introduces the solution of the embodiments of the disclosure from the perspective of interaction between various network elements. It can be understood that, in order to achieve the above functions, the user equipment and the network side device include corresponding hardware structures and/or software modules used for performing each function. Those of ordinary skill in the art will appreciate that units and algorithm steps of each example described with reference to the embodiment disclosed herein can be implemented in hardware or a combination of hardware and computer software. Whether a certain function is executed in hardware or in the form that computer software drives hardware depends on the specific application and design constraints of the solution. For each specific application, a person skilled in the art can use different methods for implementing the described functions, but such implementation should not be considered to be beyond the scope of the present application.

The embodiments of the present disclosure may perform functional unit division on the user equipment and the network side device according to the above method example. For example, each functional unit may be divided according to each function, or two or more functions may be integrated into one processing unit. The above integrated unit can be implemented in the form of hardware or in the form of a software program module. It should be noted that the division of the unit in the embodiments of the present disclosure is illustrative and is only a logical function division, and there may be other division ways in actual implementation.

Figure 6:
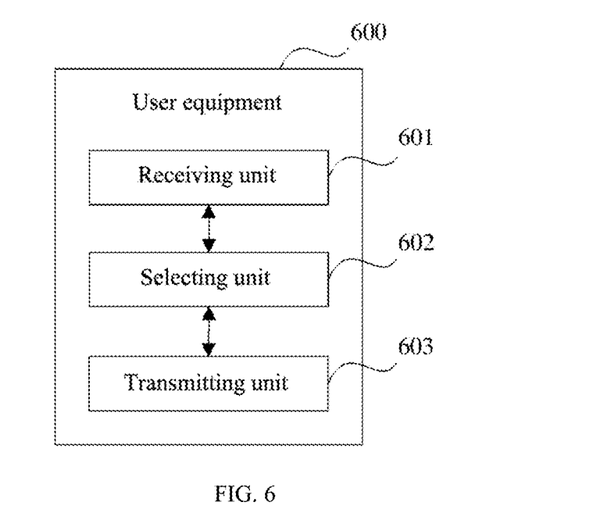
FIG. 6 is a structural diagram of functional units of a user equipment according to an embodiment of the present disclosure.

In case that an integrated unit is employed, FIG. 6 illustrates a structural diagram of possible functional units of a user equipment according to an embodiment of the present disclosure, and the user equipment is applied to the user equipment described above in the above embodiment. The user equipment 600 includes: a receiving unit 601 (such as a radio frequency chip), a selecting unit 602 (such as a processor) and a transmitting unit 603 (such as a radio frequency chip).

The receiving unit 601 is configured to determine at least one item of serial number information indicated by a network side device, where the at least one item of serial number information is associated with a resource indicator of at least one channel state information reference signal (CSI-RS) and with at least one random access resource subset;

the selecting unit 602 is configured to measure the at least one CSI-RS in order to select a CSI-RS, and select a preamble from a random access resource subset corresponding to the selected CSI-RS;

the transmitting unit 603 is configured to transmit the selected preamble.

In a possible example, the user equipment further includes a determining unit (such as a processor), and the determining unit is configured to determine serial number information corresponding to the selected CSI-RS according to a first mapping relationship set between serial number information and a resource indicator of a CSI-RS; and determine the random access resource subset corresponding to the selected CSI-RS according to a preset second mapping relationship set between serial number information and a random access resource subset.

In a possible example, the serial number information is a dedicated number of each CSI-RS in at least one CSI-RS signal pre-configured by a network side device for the user equipment or in at least one CSI-RS signal measurement activated by the network side device for the user equipment.

In a possible example, the serial number information is a sequence number of each CSI-RS in at least one CSI-RS signal pre-configured by a network side device for the user equipment or in at least one CSI-RS signal measurement activated by the network side device for the user equipment, the sequence number includes any one of the following: a time domain sequence number, a resource location sequence number, CSI-RS resource identification information, configuration signaling, or a field sequence number in activation signaling.

In a possible example, the random access resource subset is a combination of a random access channel (PRACH) resource and/or a resource for preamble indices, and the PRACH resource includes a PRACH time domain resource and/or a PRACH frequency domain resource.

In a possible example, the random access resource subset includes a preamble index.

In a possible example, the PRACH is a PRACH signal used for random access, or is a PRACH signal or a PRACH-like signal used for transmitting a beam recovery request to a network side device in a beam failure recovery process.

In a possible example, the at least one CSI-RS is correspondingly carried on at least one beam, and a beam for carrying the selected CSI-RS is a downlink transmission beam that is determined by the user equipment for transmission of at least part of steps in a random access process.

The user equipment involved in the embodiments of the present disclosure may be the user equipment shown in FIG. 4.

Figure 7:
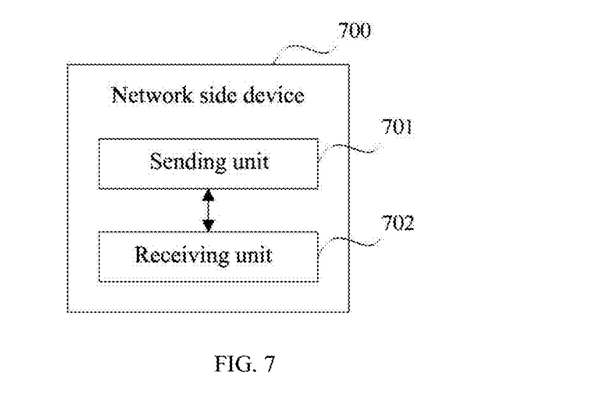
FIG. 7 is a structural diagram of functional units of a network side device according to an embodiment of the present disclosure.

In case that an integrated unit is employed, FIG. 7 illustrates a structural diagram of possible functional units of a network side device according to an embodiment of the present disclosure, and the network side device is applied to the network side device. Network side device 700 includes: a transmitting unit 701 (such as a communication interface) and a receiving unit 702 (such as a communication interface).

The sending unit 701 is configured to send to the user equipment at least one item of serial number information, where the at least one item of serial number information is associated with a resource indicator of at least one channel state information reference signal (CSI-RS) and with at least one random access resource subset;

the receiving unit 702 is configured to receive a preamble sent by the user equipment, the preamble is selected by the user equipment from a random access resource subset corresponding to a selected CSI-RS, and the selected CSI-RS is selected by measuring the at least one CSI-RS.

In a possible example, the random access resource subset corresponding to the selected CSI-RS is determined by the user equipment according to a preset second mapping relationship between the serial number information and the random access resource subset, where serial number information corresponding to the selected CSI-RS is determined by the user equipment according to a first mapping relationship set between serial number information and a resource indicator of a CSI-RS.

In a possible example, the serial number information is a dedicated number of each CSI-RS in at least one CSI-RS signal pre-configured by a network side device for the user equipment or in at least one CSI-RS signal measurement activated by the network side device for the user equipment.

In a possible example, the serial number information is a sequence number of each CSI-RS in at least one CSI-RS signal pre-configured by a network side device for the user equipment or in at least one CSI-RS signal measurement activated by the network side device for the user equipment, and the sequence number includes any one of the following: a time domain sequence number, a resource location sequence number, CSI-RS resource identification information, configuration signaling, or a field sequence number in activation signaling.

In a possible example, the random access resource subset is a combination of a random access channel PRACH resource and/or a resource for preamble indices, where the PRACH resource includes a PRACH time domain resource and/or a PRACH frequency domain resource.

In a possible example, the random access resource subset includes a preamble index.

In a possible example, the PRACH is a PRACH signal used for random access, or is a PRACH signal or a PRACH-like signal used for transmitting a beam recovery request to a network side device in a beam failure recovery process.

In a possible example, the network side device further includes a configuring unit (such as a processor), and the configuring unit is used for: carrying the preset indication information when configuring a CSI-RS, in order to indicate the first mapping relationship set and the second mapping relationship set; or carrying the preset indication information when activating a CSI-RS measurement, in order to indicate the first mapping relationship set and the second mapping relationship set; or transmitting the preset indication information, in order to indicate the first mapping relationship set and the second mapping relationship set; or presetting and storing the first mapping relationship set and the second mapping relationship set.

The network side device involved in the embodiments of the present disclosure may be the network side device shown in FIG. 5.

The embodiments of the present disclosure further provide a computer storage medium used for storing a computer program, where the computer program causes the computer to perform any of the above steps according to the embodiments of the present disclosure, and the above computer includes a network side device and a user equipment.

The embodiments of the present disclosure further provide a computer program product, including a computer program, the above computer program is operative to cause a computer to perform steps in any of the above steps according to the embodiments of the present disclosure, and the above computer includes a network side device and a user equipment.

The steps of the method or algorithm described in the embodiments of the present disclosure may be implemented in a hardware form, or may be implemented in a form that a processor executes a software instruction. The software instruction may be composed of corresponding software modules that may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read only (CD-ROM) or any other form of storage medium known in the art. An exemplary storage medium is coupled to a processor so as to enable the processor to read information, and to write information to the storage medium. Certainly, the storage medium can also be a part of the processor. The processor and the storage medium can be located in an application specific integrated circuit (ASIC). In addition, the ASIC may be located in an access network device, a target network device or a core network device. Certainly, the processor and the storage medium may also exist as discrete components in an access network device, a target network device or a core network device.

Those skilled in the art should appreciate that in one or more of the above examples, the function described in the embodiments of the present disclosure may be implemented in whole or partially by software, hardware, firmware, or any combination thereof. When the function is implemented by software, it may be implemented in whole or partially in the form of a computer program product. The computer program product includes one or more computer instructions. When the computer program instructions are loaded and executed on a computer, the process or function described according to the embodiments of the present disclosure are generated in whole or partially. The computer can be a general computer, a dedicated computer, a computer network or other programmable device. The computer instruction can be stored in a computer storage medium, or be transferred from one computer storage medium to another computer storage medium, for example, the computer instruction may be carried and transmitted from a website site, a computer, a server or a data center in a wired manner (for example, a coaxial cable, a fiber, a digital subscriber line (DSL) or a wireless manner (for example, infrared, wireless, microwave, etc.) to another website, computer, server or data center. The computer storage medium can be any available media that can be accessed by a computer, or can be a data storage device such as a server, a data center that includes one or more available media. The available medium may be a magnetic medium (for example, a floppy disk, a hard disk and a magnetic tape), an optical medium (for example, a digital video disc (DVD)), or a semiconductor medium (for example, a solid state disk (SSD)), etc.

The purpose, technical solution and beneficial effect of the embodiments of the present disclosure have been described in detail in the above specific implementation manners. It should be understood that the above is only the specific implementation manner of the embodiments of the present disclosure, and is not used to limit the protection scope of the embodiments of the disclosure. Any modifications, equivalents, improvements, etc., which are obtained on the basis of the embodiments of the present disclosure, shall be included in the protection scope of the embodiments of the present disclosure.

What is claimed is:

1. A method for transmitting a random access signal, comprising:
   determining, by a user equipment, at least one item of serial number information indicated by a network side device, wherein the at least one item of serial number information is transmitted by the network side device to the user equipment, and wherein the at least one item of serial number information is associated with a resource indicator of at least one channel state information reference signal (CSI-RS) and with at least one random access resource subset;

measuring, by the user equipment, the at least one CSI-RS to select a CSI-RS, and selecting a preamble from a random access resource subset corresponding to the selected CSI-RS; and transmitting, by the user equipment, the selected preamble;

wherein the method further comprises:

determining, by the user equipment, serial number information corresponding to the selected CSI-RS according to a first mapping relationship set between serial number information and a resource indicator of a CSI-RS; and determining, by the user equipment, the random access resource subset corresponding to the selected CSI-RS according to a preset second mapping relationship set between serial number information and a random access resource subset;

wherein the serial number information is a dedicated number or a sequence number of each CSI-RS in at least one CSI-RS signal pre-configured by the network side device for the user equipment or in at least one CSI-RS signal measurement activated by the network side device for the user equipment.

2. The method according to claim 1, wherein the sequence number comprises any one of the following: a time domain sequence number, a resource location sequence number, CSI-RS resource identification information, configuration signaling, or a field sequence number in activation signaling.

3. The method according to claim 1, wherein the random access resource subset is a combination of a random access channel (PRACH) resource and a resource for preamble indices or is a random access channel (PRACH) resource or is a resource for preamble indices, and the PRACH resource comprises a PRACH time domain resource and a PRACH frequency domain resource or comprises a PRACH time domain resource or comprises a PRACH frequency domain resource.

4. The method according to claim 3, wherein the PRACH is a PRACH signal used for random access, or is a PRACH signal or a PRACH-like signal used for transmitting a beam recovery request to the network side device in a beam failure recovery process.

5. The method according to claim 1, wherein the random access resource subset comprises a preamble index.

6. The method according to claim 1, wherein the at least one CSI-RS is correspondingly carried on at least one beam, and a beam for carrying the selected CSI-RS is a downlink transmission beam that is determined by the user equipment for transmission of at least part of steps in a random access process.

7. A user equipment, comprising: a processor, a memory, a radio frequency chip and a program, wherein the program is stored in the memory and configured to be executed by the processor, and the program comprises an instruction used to perform steps of:

determining at least one item of serial number information indicated by a network side device, wherein the at least one item of serial number information is transmitted by the network side device to the user equipment, and wherein the at least one item of serial number information is associated with a resource indicator of at least one channel state information reference signal (CSI-RS) and with at least one random access resource subset;

measuring the at least one CSI-RS to select a CSI-RS, and selecting a preamble from a random access resource subset corresponding to the selected CSI-RS; and transmitting the selected preamble;

wherein the program further comprises an instruction used to perform steps of:

determining serial number information corresponding to the selected CSI-RS according to a first mapping relationship set between serial number information and a resource indicator of a CSI-RS; and determining the random access resource subset corresponding to the selected CSI-RS according to a preset second mapping relationship set between serial number information and a random access resource subset;

wherein the serial number information is a dedicated number or a sequence number of each CSI-RS in at least one CSI-RS signal pre-configured by the network side device for the user equipment or in at least one CSI-RS signal measurement activated by the network side device for the user equipment.

8. The user equipment according to claim 7, wherein the sequence number comprises any one of the following: a time domain sequence number, a resource location sequence number, CSI-RS resource identification information, configuration signaling, or a field sequence number in activation signaling.

9. The user equipment according to claim 7, wherein the random access resource subset is a combination of a random access channel (PRACH) resource and a resource for preamble indices or is a random access channel (PRACH) resource or is a resource for preamble indices, and the PRACH resource comprises a PRACH time domain resource and a PRACH frequency domain resource or comprises a PRACH time domain resource or comprises a PRACH frequency domain resource.

10. The user equipment according to claim 9, wherein the PRACH is a PRACH signal used for random access, or is a PRACH signal or a PRACH-like signal used for transmitting a beam recovery request to the network side device in a beam failure recovery process.

11. The user equipment according to claim 7, wherein the random access resource subset comprises a preamble index.

12. The user equipment according to claim 7, wherein the at least one CSI-RS is correspondingly carried on at least one beam, and a beam for carrying the selected CSI-RS is a downlink transmission beam that is determined by the user equipment for transmission of at least part of steps in a random access process.

13. A network side device, comprising: a processor, a memory, a communication interface and a program, wherein the program is stored in the memory and configured to be executed by the processor, and the program comprises an instruction for performing steps of:

indicating and transmitting at least one item of serial number information to a user equipment, wherein the at least one item of serial number information is associated with a resource indicator of at least one channel state information reference signal (CSI-RS) and with at least one random access resource subset; and receiving a preamble sent by the user equipment, wherein the preamble is selected by the user equipment from a random access resource subset corresponding to a selected CSI-RS, and the selected CSI-RS is selected by measuring the at least one CSI-RS;

wherein the random access resource subset corresponding to the selected CSI-RS is determined by the user equipment according to a preset second mapping relationship between serial number information and a random access resource subset, wherein serial number information corresponding to the selected CSI-RS is determined by the user equipment according to a first mapping relationship set between serial number information and a resource indicator of a CSI-RS;

wherein the serial number information is a dedicated number or a sequence number of each CSI-RS in at least one CSI-RS signal pre-configured by the network side device for the user equipment or in at least one CSI-RS signal measurement activated by the network side device for the user equipment.

14. The network side device according to claim 13, wherein the program further comprises an instruction for performing steps of:

carrying preset indication information when configuring a CSI-RS, in order to indicate the first mapping relationship set and the second mapping relationship set; or carrying preset indication information when activating a CSI-RS measurement, in order to indicate the first mapping relationship set and the second mapping relationship set; or transmitting preset indication information, in order to indicate the first mapping relationship set and the second mapping relationship set; or presetting and storing the first mapping relationship set and the second mapping relationship set.

* * * * *